J. R. BROWNING.
PEDAL ATTACHMENT FOR AUTOMOBILES.
APPLICATION FILED JULY 3, 1919.
1,316,416.  Patented Sept. 16, 1919.
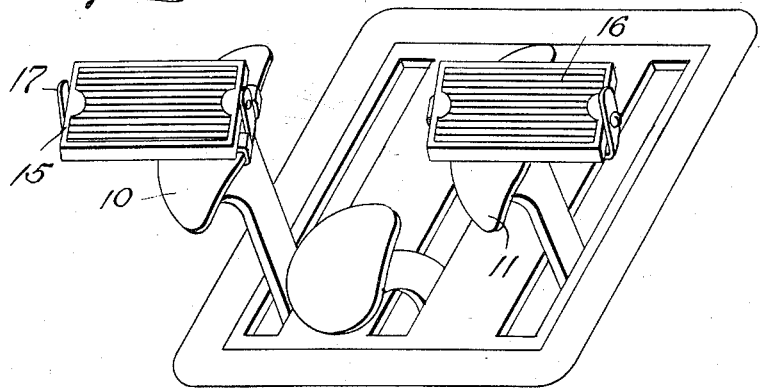
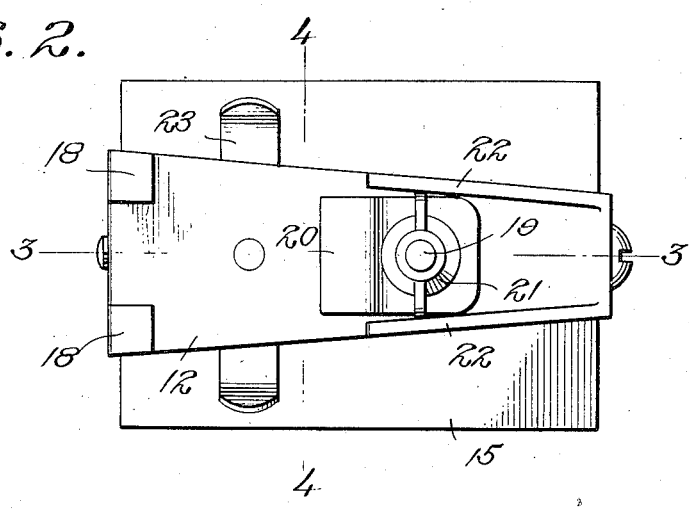
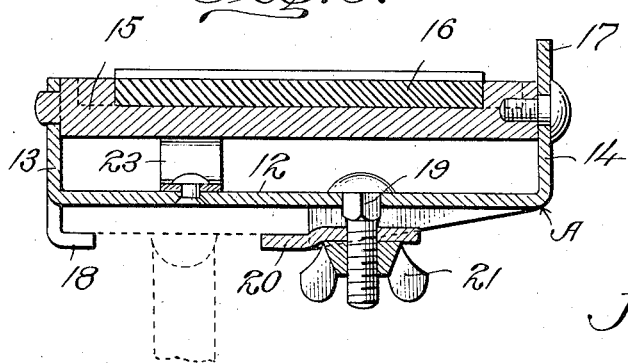
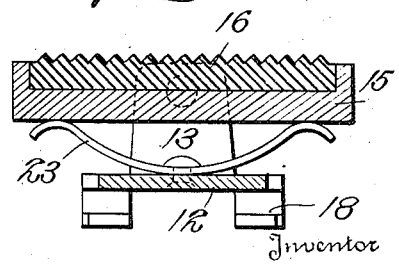
Inventor
John R. Browning,
By Henry P. Right
Attorney

UNITED STATES PATENT OFFICE.

JOHN R. BROWNING, OF DEER PARK, MARYLAND.

PEDAL ATTACHMENT FOR AUTOMOBILES.

1,316,416.   Specification of Letters Patent.   Patented Sept. 16, 1919.

Application filed July 3, 1919. Serial No. 308,411.

*To all whom it may concern:*

Be it known that I, JOHN R. BROWNING, a citizen of the United States, residing at Deer Park, in the county of Garrett, State of Maryland, have invented certain new and useful Improvements in Pedal Attachments for Automobiles, of which the following is a specification.

My invention relates to pedal attachments and particularly to attachments of this type for use in connection with the clutch and brake pedals of "Ford" cars.

The clutch and brake pedals of "Ford" cars have been found too narrow for ease in operating and are also what might be termed stiff pedals not adapted to adjust themselves to the position of the operator's foot.

It is therefore the purpose of my present invention to provide an attachment particularly adapted for use in connection with the brake and clutch pedals of "Ford" cars which will afford the requisite support for the foot of the operator and which will adjust themselves automatically during the operation of the pedal so as to relieve the latter of its nautral stiffness.

It is also my purpose to provide a pedal attachment wherein the adjustment of the foot block thereof is gradual or yielding, the adjustment being slightly resisted to prevent abruptness in operation and to transmit such force as may be required in its adjustment to the pedal at all times and thereby prevent lost motion of any type in the operation of the pedals.

With the above and other purposes in view my invention consists in the details of construction and in the arrangement and combination of parts to be hereinafter more fully described and particularly pointed out in the claims.

In describing the invention in detail reference will be had to the accompanying drawing wherein like characters of reference denote corresponding parts in the several views, and in which—

Figure 1 is a perspective view showing the application of my attachment;

Fig. 2, a rear view of the attachment;

Fig. 3, a section on the line 3—3 of Fig. 2; and

Fig. 4, a section on the line 4—4 of Fig. 2.

Referring to the drawing 10 indicates the clutch pedal and 11 the brake pedal. These pedals illustrate a type of pedal employed in the well known "Ford" car, which are provided with foot portions that are substantially elliptical in form and so relatively small as to provide inadequate support for feet of average size, and my improved attachment is adapted to be applied to this style of pedal, to provide adequate support for the feet of the driver, to provide adequate adjustment to the feet and to prevent the feet of the driver from slipping laterally with the consequent liability of accident.

My improved pedal attachment is shown as comprising a U-shaped member A including an arm connecting portion 12 and inner and outer arms 13 and 14. Pivoted between the arms 13 and 14 is a foot block 15, preferably constructed of metal and carrying centrally a rubber tread 16. The arm 14 of the member A is extended beyond the tread surface of the block 15 to form a stop 17 for the purpose of preventing lateral slipping of the foot from the pedal as will be obvious. The arm connecting portion 12 at the end thereof adjacent the arm 13 carries inwardly directed hooks or retaining members 18 which are adapted to engage against the side and the bottom of the foot support of the related pedal. Also carried by the arm connecting portion 12 is a bolt 19 which is engaged through a locking plate 20 and carries a winged nut 21 for the purpose of forcing the plate 20 toward the arm connecting portion 12. This locking plate 20 is adapted to be forced against the bottom of the foot portion of the related pedal to complete the locking of the attachment to said pedal. The locking plate 20 is held against rotation on the bolt 19 by means of flanges 22 formed on the arm connecting portion 12 and between which said plate extends. Secured to the arm connecting portion 12 and extending transversely of the latter is a substantially bow-shaped leaf spring 23 the ends of which coact with the underside of the foot block 15 and normally maintain said block in a plane substantially at right angles to the central plane of the U-shaped member A.

In use it will be obvious that as the pedal is operated through the instrumentality of the attachment the spring 23 will yield and permit the block 15 to adjust itself to the foot. However, this adjustment is to a certain degree resisted by the spring 23 so that no abrupt adjustment takes place and furthermore, the resistance to adjustment offered by the spring 23 causes all of the intended pedal operating force to be transmitted to the pedal so that no lost effort is experienced.

By use of my invention it will be obvious that the person driving the car can easily keep his feet on the tread surface of the foot block 15 which has a relatively much larger tread than the foot portion of the associated pedal, while the stop 17 will prevent any side slipping of the driver's foot tending to disengage the latter from the foot block.

What I claim is:—

1. A pedal attachment comprising a U-shaped member having its arm connecting portion provided with means for attaching the member to a pedal, a foot block pivoted between the arms of the member, and means for yieldingly holding the block in a plane substantially at right angles to the central plane of the member.

2. A pedal attachment comprising a U-shaped member having its arm connecting portion provided with means for attaching the member to a pedal, a foot block pivoted between the arms of the member, and a spring device between the block and arm connecting portion for yieldingly holding the block in a plane substantially at right angles to the central plane of the member.

3. A pedal attachment comprising a U-shaped member having its arm connecting portion provided with means for attaching the member to a pedal, a foot block pivoted between the arms of the member, and a bow-shaped leaf spring carried by the arm connecting portion transversely of the latter and bearing at its ends against the foot block on opposite sides of the pivot of the latter respectively to yieldingly hold said block in a plane substantially at right angles to the central plane of the member.

4. A pedal attachment comprising a U-shaped member, hook elements carried by said member for interlocking with the foot portion of a pedal, a locking plate carried by the arm connecting portion, means for forcing said locking plate against the underside of the foot portion of a pedal, a foot block pivoted between the arms of the member, and means for yieldingly holding the block in a plane substantially at right angles to the central plane of the member.

In testimony whereof, I affix my signature in the presence of two witnesses.

JOHN R. BROWNING.

Witnesses:
   H. A. RASCHE,
   JOHN M. JARBOE.